Jan. 23, 1962     J. F. LASH ETAL     3,017,773
BALANCING MACHINE
Filed June 7, 1956     3 Sheets-Sheet 2
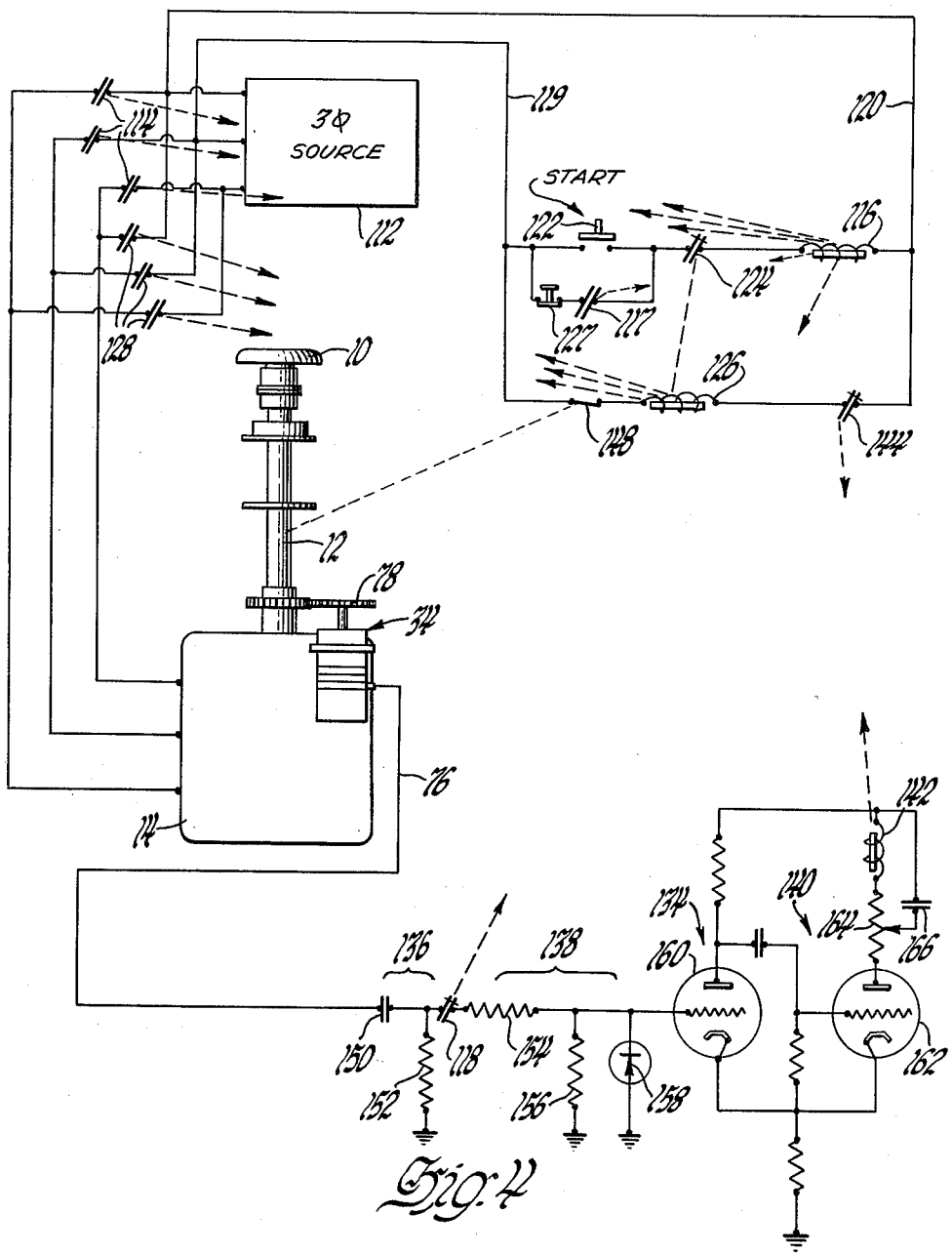

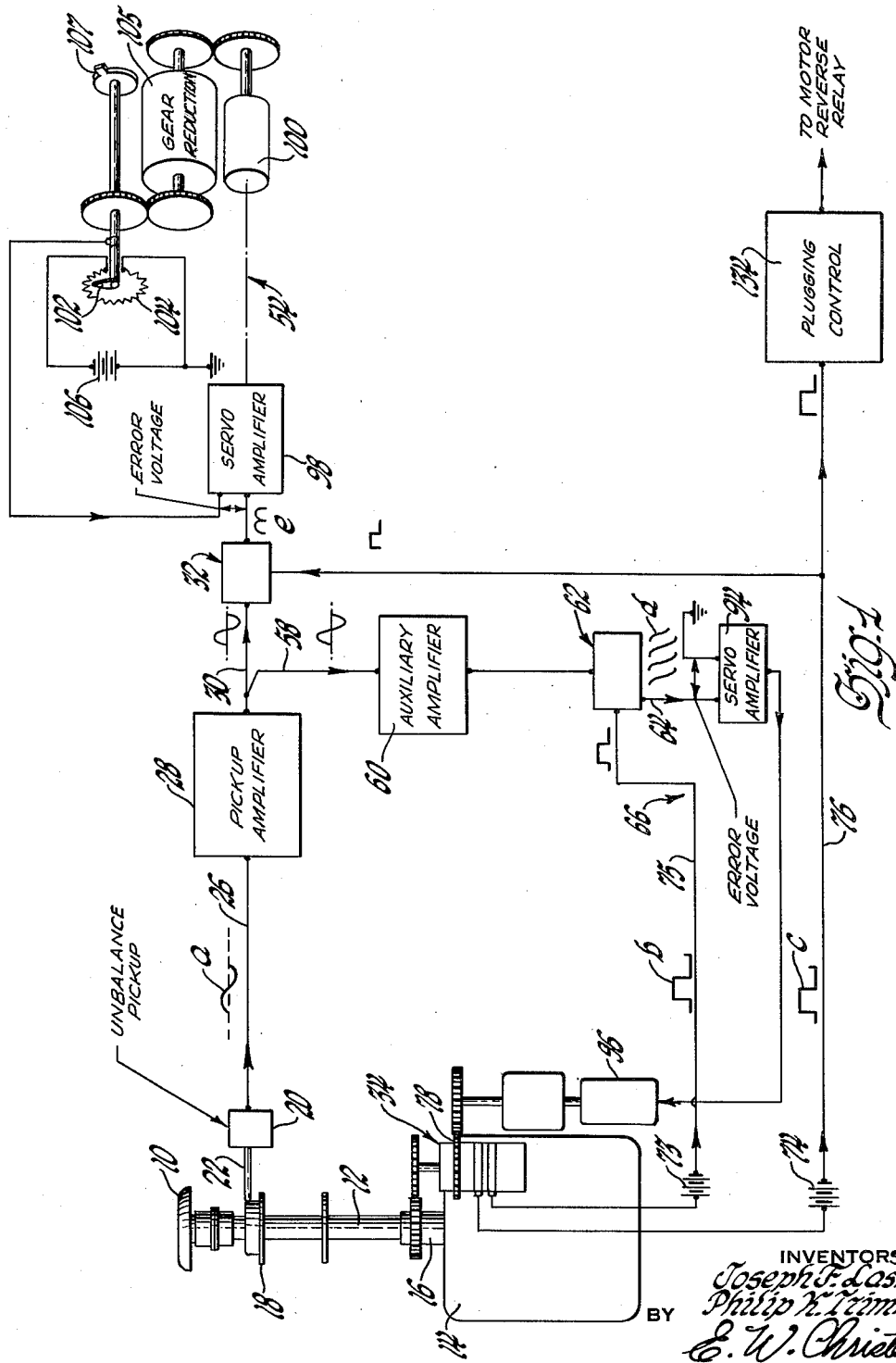

Jan. 23, 1962   J. F. LASH ETAL   3,017,773
BALANCING MACHINE

Filed June 7, 1956   3 Sheets-Sheet 3

INVENTORS
Joseph F. Lash &
BY Philip N. Trimble
E. W. Christen
ATTORNEY

United States Patent Office 3,017,773
Patented Jan. 23, 1962

3,017,773
BALANCING MACHINE
Joseph F. Lash, Ferndale, and Philip K. Trimble, Royal Oak, Mich., assignors to General Motors Corporation, Detroit, Mich., a corporation of Delaware
Filed June 7, 1956, Ser. No. 589,947
3 Claims. (Cl. 73—462)

This invention relates generally to unbalance measuring and correcting installations in which a part is rotated to determine the magnitude and location of any unbalance therein and is corrected thereafter in accordance with the unbalance magnitude and location measurements to place the part in balance. More particularly, the invention relates to dynamic stopping means for bringing the part to a rapid stop after the determination of the unbalance magnitude and location therein and to control means for said stopping means controlling the initiation of the operation thereof so that the part will stop with the point at which it is to be placed in balance located in a predetermined position on the balancing machine.

Such balancing installations as have been provided heretofore require a substantial amount of time, after the unbalance magnitude and location have been determined therein and the part has been brought to a stop, to reposition the part manually or otherwise in order that the point at which the part is to be placed in balance will be located at a certain position on the balancing machine in which the part is to be corrected. It is apparent that by bringing the part to a controlled stop so that the angle of correction always falls at a certain position or within a slight distance thereof, the time required to reposition the part after stopping may be diminished greatly or eliminated completely. It is apparent that such apparatus would be especially desirable in present day automatic and semi-automatic balancing installations in respect of the increased accuracy, elimination of manually or otherwise performed repositioning operations, the reduction of cycle time and the consequent increased system production rate afforded thereby.

The present invention has for its general object to provide a dynamic stopping control means in balancing installations of the above and a related character in which the part is brought to a rapid controlled stop with the unbalance therein located at a predetermined position or region adjacent a fixed portion of the balancing installation.

The manner in which the above and other objects, advantages and features of the present invention will appear more fully from the following detailed description and drawings in which:

FIG. 1 is a diagrammatic representation of a balancing installation utilizing a dynamic stopping and control apparatus in accordance with the present invention;

FIG. 4 is a diagrammatic electrical circuit representation of a dynamic stopping installation and initiating control therefor in accordance with the present invention.

Figure 2:
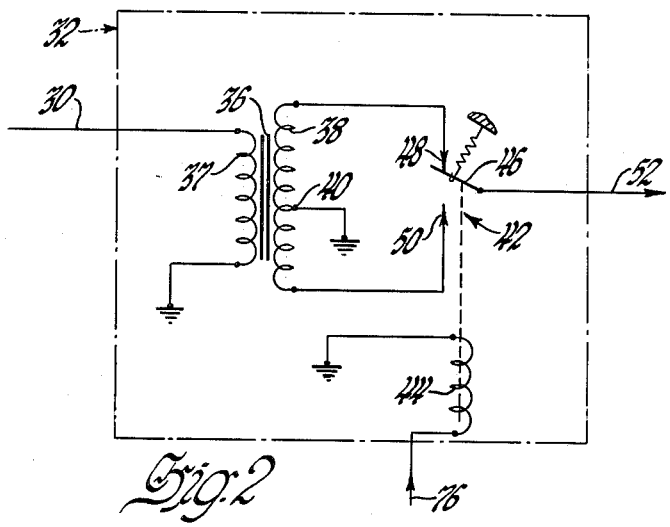
FIG. 2 is a schematic representation of a demodulator chopper device used in the measuring apparatus of FIG. 1.

Referring to the drawings, the invention is shown in a static type balancing machine in which the part 10, whose characteristics of unbalance are to be determined, is mounted on a vertically disposed, flexibly mounted spindle 12 driven by a constant speed electrical drive motor 14 having a hollow drive shaft 16. The machine spindle extends coaxially through the hollow drive shaft of the motor and is connected at its lowermost end to the lower end of the motor drive shaft through a universal joint or connection, in known manner. The uppermost portion of the spindle is supported in a resiliently mounted bearing 18 which permits oscillation or deflection of the balancing machine spindle under the influence of unbalance in the workpiece 10.

Suitably mounted in contacting relation with the vibratile or oscillatable spindle 12 or bearing 18 is a conventional pickup transducer 20, which may be of the electrodynamic variety having a spring urged movable probe portion 22 shown abutting or engaging the bearing 18. The pickup develops an alternating current sinusoidal signal shown at $a$ having a frequency corresponding to the speed of the drive motor and an amplitude that varies in accordance with the amount of unbalance in the workpiece, as determined by the amount of radial deflection of the balancing machine spindle. The electrical signal developed by the pickup will bear a phase relationship with respect to a fixed point on the spindle or workpiece corresponding to the location of the unbalance.

The output from the pickup is applied over conductor 26 to a conventional amplifier 28 whose output is connected over conductor 30 to the input of a demodulator or chopper device 32. A suitable form of demodulator device is illustrated in FIG. 2 comprising a synchronous, electromechanical chopper relay controlled from a variable contactor or breaker mechanism shown at 34 (see FIGURES 1 and 3). The demodulator includes a transformer 36 having a primary winding 37 and a secondary winding 38 with a grounded center tapped connection 40 and a S.P.D.T. relay 42. The relay includes an actuating coil 44 for operating its spring biased switch arm 46 between a pair of fixed contacts 48 and 50 which are connected to the opposite ends of the transformer secondary winding.

Switch arm 46 is connected over conductor 52 to the input of a servo positioning follow-up system 54 which is actuated in accordance with the magnitude of the unbalance in the workpiece 10.

The output of the amplifier 28 is also supplied over branch conductor 58 through an auxiliary amplifier 60 to the input of another demodulator or chopper device, which is indicated generally at 62 and is of identical construction with the chopper 32. The chopper device 62 is controlled from another output of the variable phase contactor 34 and supplies an output signal over conductor 64 to a servo positioning follow-up system 66 which is actuated in accordance with the angular location of unbalance in the workpiece.

Figure 3:
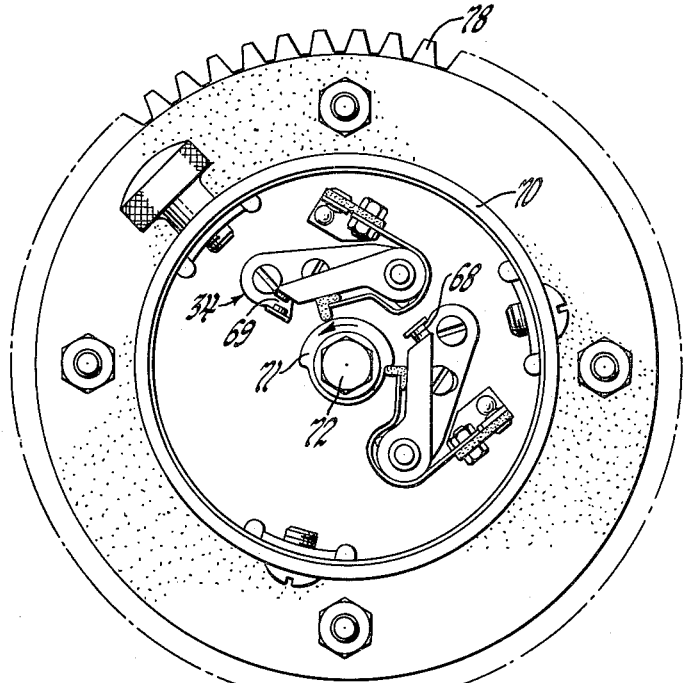
FIG. 3 illustrates the general form of a variable phase contactor device used in the measuring apparatus of FIG. 1.

A suitable form of variable contact mechanism 34 is illustrated in FIG. 3 which includes two sets of separable contact points 68 and 69, similar to those employed in an automobile distributor. The points are mounted 90° in space apart within a stator casing or housing 70 and are driven by a single lobe cam 71 on a rotor shaft 72 driven at spindle speed to cause each set of contact points to be closed for 180° and open for 180°, the initiation of the opening or closing of the contacts 68 occurring one quarter revolution of the spindle 12 in time in advance of the opening or closing of the contacts 69. The position of the contact points and therefore their instants of opening and closing will always be known relative to a fixed point on the spindle. The contact points are connected in separate circuits each of which includes a battery source 73, 74 to supply a pair of commutating or square wave signals $b$ and $c$ displaced 90° in time apart over conductors 75 and 76 to the relay coils of the angle chopper 62 and the amount chopper 32, respectively.

The stator casing of the variable contact mechanism has a pinion gear 78 mounted thereon by means of which the stator and contact points can be rotatably adjusted as a unit with respect to the driver cam 71, which is shown rotatably driven from the machine spindle.

The chopper relays 32 and 62 perform a commutating action on the unbalance pickup signal applied to their inputs. The output of the chopper relay 62 is applied to the servo amplifier 94, which may be of the magnetic amplifier variety, to control the extent and direction of rotation of a servo motor 96. Servo motor amplifiers 94 and 96 form no part of the invention and may be of any suitable type such as the A.C. output, D.C. control, single phase, push pull magnetic amplifier shown in FIGURE 23, page 26 of Bulletin #1105–1 issued by Electric Products Division of Vickers Incorporated. This motor positions the housing of the variable contactor mechanism to change the position of the contacts 68 and 69 relative to the cam 71, thereby adjusting the occurrence in time of the commutating square waves $b$ and $c$ until one of the commutating signals, say $b$, is 90° out of phase with the unbalance pickup signal and the other commutating signal, $c$, is in phase therewith. Signal $b$ is applied to the actuating coil of the relay chopper 62 which commutates the unbalance signal at 90° and 270° intervals to produce the wave illustrated at $d$ in the output of the chopper relay. The average value of the wave $d$ under these conditions will be seen to be zero so that no signal will be applied to the input of the magnetic amplifier 94 to energize the angle servo motor 96 whose shaft position will then be related to the angular location of unbalance in the workpiece. For any other angular separation between the closing or opening of the breaker contacts in the variable contact mechanism and the point at which the unbalance pickup signal passes through zero, a time average value of output voltage will be obtained from the chopper relay 62 to cause the angle servo positioning system, constituted by the amplifier 94, servo motor 96 and variable contact mechanism 34, to rotate the servo motor and the contactor mechanism housing. The contactor housing is rotatably adjusted until the commutating wave $b$ supplied therefrom occurs 90° in time from the unbalance pickup signal and thereby causes the chopper relay 62 to develop a null or zero time average value of output voltage.

When the variable contactor mechanism has been adjusted to null the output of the chopper relay 62, the commutating signal $c$ will be in phase with the unbalance pickup signal and will perform a commutation thereon in the chopper relay 32 to produce an output signal shown at $e$. This signal, whose average value is related to the magnitude of the unbalance in the workpiece, is then applied to the servo positioning follow-up system in the amplitude channel of the measuring apparatus.

This follow-up system includes a magnetic servo amplifier 98 whose output is connected to the control winding of an amplitude servo motor shown at 100. The motor 100 positions the slider arm 102 of an adjustable potentiometer device 104 through suitable reduction gearing indicated generally at 105. The potentiometer 104 is shown energized from a D.C. source of reference voltage 106 to supply a loop closing, position feedback D.C. signal to the input of the amplifier 98, in known manner. At balance or equilibrium, the position feedback signal will oppose the average value of the input signal to the amplifier from the chopper 32, thus nulling the error signal which controls the energization of the servo motor 100. The shaft of the potentiometer 104 will then assume a position corresponding to the average value of the commutated signal $e$ applied to the servo amplifier from the chopper 32. A cam 107 on the same shaft as the arm of the potentiometer is thus positioned by the above action in proportion to the amount of the unbalance. This cam is associated with the unbalance correcting apparatus, which may be suitable drilling or welding apparatus for removing or adding material to the workpiece, and may control the position of the drill depth control or meter the amount of strip feed to be cut off and welded to the workpiece, depending upon the character of the correcting apparatus.

In order to bring the part on the spindle to a rapid stop after determination of the magnitude and location of unbalance therein, the balancing installation in FIG. 1 is provided with a dynamic stopping circuit shown in FIG. 4 as a reversing or plugging control for the drive motor 14. Alternatively, a dynamic braking stopping control could be employed.

The drive motor 14 may be a polyphase A.C. motor connected in an energizing circuit to a three-phase supply source indicated diagrammatically at 112, through the normally open power or breaker contacts 114 of a motor forward control relay 116. The relay 116 is connected in a single phase control circuit for energization from source 112 over conductors 119 and 120 through a spring return, start button 122, which is shunted by a set of normally open hold-in contacts 117 of relay 116, and the normally closed contacts 124 of a motor reversing relay 126. A normally closed stop button 127 is shown connected in series with the hold-in contacts 117. Relay 126 controls the energization of the motor 14 for rotation in a reverse direction under plugging conditions in which the relay is energized to close its power contacts 128 in the motor energizing circuit and to open its contacts 124 in the control circuit of the forward relay 116.

In accordance with the present invention the moment of energizing the reverse relay 126 to initiate the operation of the plugging circuit is caused to be related to the location of unbalance in the part so that the part will always stop with the point at which it is to be placed in balance located in a certain position on the balancing machine. This position corresponds to the angular position of the work tool or electrode of the unbalance correcting apparatus relative to a fixed point or reference on the balancing machine.

The initiation of the operation of the plugging circuit is controlled by a control signal or impulse applied over conductor 76 from the variable phase contactor 34 to a plugging initiating control unit 134. The plugging initiating control circuit 134 comprises, in general, a differentiating circuit 136, a clipping or limiting circuit 138 and a one-shot multivibrator 140 which are connected in cascade and control the energization of a relay 142 in the output of the multivibrator.

The relay 142 has a pair of normally closed contacts 144 that are located in the energizing or control circuit of the motor reversing relay 126. The actuating coil of the relay 126 is connected across conductors 119 and 120 through a zero speed switch 148 driven from the spindle 12 and the contacts 144 of the plugging initiating control relay 142 when the latter is de-energized. The speed switch 148 may be of any suitable form. An example of a suitable switch is an Allen-Bradley Bulletin 808, Zero Speed Plugging Switch. The speed switch 148 has an adjustment, not shown, to cause the switch to open just prior to the stoppage of spindle 12 and motor 14 so that the spindle just comes to a stop without reversing.

In its normal operating condition prior to the actuation of the stop button 127, the plugging initiating control relay 142 is energized and its contacts 144 are open, thus interrupting the energization of the motor reversing or plugging relay 126. Upon completion of the unbalance measuring cycle, the stop button 127 is actuated to de-energize the relay 116, which then closes an auxiliary set of normally closed contacts 118 shown located between the differentiating and clipper circuits 136 and 138.

After the angle servo motor 96 has come to rest, the commutating or control signal will have a known phase relationship relative to the unbalance pickup signal or the point in time at which the unbalance pickup signal passes through zero, as has been discussed hereinabove. The commutating signal is applied to the differentiating circuit composed of the condenser 150 and resistor 152 and is differentiated therein to produce a pair of pulses of opposite polarity synchronized with the leading and trailing edges of the commutating or control signal. The clipper 138, shown as comprising the series resistors 154 and 156 and a selenium or germanium diode 158 shunting the resistor 156, selects, say, the positive going pulse and supplies it to the input of the multivibrator. The multivibrator 140 may be a conventional one-shot multivibrator, the first section 160 of which is normally non-conducting and its second section 162 is conducting to energize the relay 142.

The application of the first positive pulse from the differentiator circuit through the contacts 118 to the clipper circuit and the multivibrator causes the first section of the multivibrator to conduct and cuts off the second section to de-energize the control relay 142. De-energization of the relay 142 causes its contacts 144 to close and connects the reverse relay 126 for energization from conductors 119 and 120 through the contacts of the speed switch 148 which are closed while the spindle is turning.

With the zero speed switch 148 closed while the spindle is turning, the contacts 144 of relay 142 determine the time when the relay 126 is energized, thus starting the plugging of the drive motor. Relay 142 remains de-energized during the off time period of the multivibrator as determined by the circuit constants thereof. The off time period of the multivibrator should be greater than the time required for the particular machine to plug the part to a complete stop and ought to include a short period, say, approximately one second, to maintain the relay 142 de-energized after the plugging is finished before returning the relay to energized condition through the multivibrator action.

The adjustable resistor 164 and the condenser 166 connected in the plate circuit of the second section 162 of the multivibrator constitute a time delay circuit which delays the de-energization of the relay 142 for a short time and serves as a stopping position adjustment control by means of which the position at which the part comes to rest may be adjusted accurately.

What is claimed is:

1. In a balancing machine including reversible drive motor means for rotating a part to be balanced, control means for said drive motor means including start means for energizing said drive means for forward operation to rotate said part in a forward direction and stop means for energizing said drive means for reverse operation to slow forward rotation of said part to a stop in a predetermined stopping time, means for controlling said start means to actuate or deactuate the same, an unbalance signal generator for developing a signal voltage having amplitude and phase corresponding respectively to the magnitude and angular location of unbalance of said part, a reference signal generator being synchronized with said drive means for developing a reference signal voltage, means connected with the unbalance and reference signal generators and responsive to said signal voltages for adjusting the phase relation thereof to a predetermined angle whereby the angular location of said unbalance relative to said reference signal voltage is known, a stopping pulse developing circuit, connecting means operative upon deactuation of said start means for connecting said stopping pulse developing circuit with said reference signal generator for developing a sharp pulse corresponding in time to a predetermined increment of said reference signal voltage, relay means connected with said stopping pulse developing circuit and including adjustable time delay means for manual adjustment of the time lapse between the occurrence of the sharp pulse and the actuation of the relay means, said relay means connected to said stop means and operable upon actuation by said sharp pulse to cause reverse energization of said drive means to slow rotation of said part at a predetermined rate to effect stopping of forward rotation of the same in said predetermined stopping time, and speed responsive means operable to deenergize said stop means to prevent reverse rotation of said part by said reverse energization of said drive means; said time lapse and said predetermined stopping time of said stop means being effective to stop said part with the angular location of the unbalance substantially in a known position.

2. In a balancing machine including reversible drive means operable to rotate a part to be balanced, an unbalanced signal generator for developing a signal voltage having an amplitude and phase corresponding respectively to the magnitude and angular location of unbalance of said part, a reference signal generator being synchronized with said drive means for developing a reference signal voltage, means connected with the unbalance and reference signal generators and responsive to said signal voltages for adjusting the phase relation thereof to a predetermined angle whereby the angular location of said unbalance relative to said reference signal voltage is known, a differentiating circuit connected in response to non-operation of said drive means with the reference signal generator to develop a pulse corresponding in time to a predetermined increment of the reference signal voltage, a one-shot multivibrator connected with said differentiating circuit and responsive to said pulse for transferring conduction from one stage thereof to the other, an adjustable time-delay relay in said other stage of the multivibrator, and stopping means for said drive means connected to and actuated by operation of said relay, said stopping means including means for reversing said drive means for a predetermined period of time to stop said drive means in a predetermined total angle of rotation, speed switch means for deactuating said stop means after said part is slowed to a predetermined speed to prevent reverse rotation of said part, said drive means and rotation of said part thereby being stopped in a known total period of time, said known total period of time after said pulse causing rotation of said part to be stopped with the angular location of the unbalance in a known position.

3. In a balancing machine including a drive motor for rotating a part to be balanced at a predetermined speed of rotation, said motor including a starting forward drive circuit and relay actuated plugging circuit for reversing the energization of the motor to rapidly stop rotation thereof in a predetermined angle of rotation, an unbalance signal generator for developing a signal voltage having amplitude and phase corresponding respectively to the magnitude and angular location of unbalance of said part, a reference signal generator being synchronized with the rotation of said motor for developing a reference signal voltage of square wave pulses, means connected with the unbalance and reference signal generators and responsive to said signal voltages for adjusting the phase relation thereof to a predetermined angle whereby the angular location of said unbalance relative to said reference signal voltage pulses is known, a differentiating circuit, means responsive to deactuation of said starting circuit to connect said differentiating circuit with the reference signal generator for developing a stopping signal pulse corresponding in time to a predetermined increment of said reference signal voltage pulses, a one-shot multivibrator connected with said differentiating circuit and responsive to the stopping signal pulses for transferring conduction from one stage to the other stage thereof, a time-delay relay in said other stage of the multivibrator, said time-delay relay having a predetermined period of delay corresponding to a predetermined angle of rotation of said part rotating at said predetermined speed and connected with said relay actuated plugging circuit of the motor to cause the same to slow forward rotation of said part to a stop in a predetermined rotational angle relative to said reference signal pulse, and speed switch means responsive to the rotational speed of said part and connected to deactuate said plugging circuit to prevent reverse rotation of said part after stopping of the same.

References Cited in the file of this patent

UNITED STATES PATENTS

| | | |
|---|---|---|
| 2,492,092 | Bulliet | Dec. 20, 1949 |
| 2,636,381 | Hagg et al. | Apr. 28, 1953 |
| 2,783,648 | Stovall et al. | Mar. 5, 1957 |
| 2,783,649 | Hope | Mar. 5, 1957 |
| 2,792,725 | Lannen | May 21, 1957 |
| 2,817,971 | Gruber | Dec. 31, 1957 |
| 2,821,858 | King | Feb. 4, 1958 |
| 2,909,948 | Gruber | Oct. 27, 1959 |

FOREIGN PATENTS

| | | |
|---|---|---|
| 643,986 | Great Britain | Oct. 4, 1950 |
| 1,119,843 | France | Apr. 9, 1956 |